(12) United States Patent
Markon et al.

(10) Patent No.: US 8,502,421 B2
(45) Date of Patent: Aug. 6, 2013

(54) MOVING MAGNET TYPE LINEAR MOTOR

(75) Inventors: Sandor Markon, Shiga (JP); Ender Kazan, Eskisehir (TR); Ahmet Onat, Istanbul (TR)

(73) Assignees: Sabanci University, Istanbul (TR); Fujitec Co., Ltd., Hikone-shi, Shiga (JP)

( * ) Notice: Subject to any disclaimer, the term of this patent is extended or adjusted under 35 U.S.C. 154(b) by 66 days.

(21) Appl. No.: 13/120,253

(22) PCT Filed: Dec. 18, 2008

(86) PCT No.: PCT/JP2008/073044
§ 371 (c)(1),
(2), (4) Date: May 26, 2011

(87) PCT Pub. No.: WO2010/038325
PCT Pub. Date: Apr. 8, 2010

(65) Prior Publication Data
US 2011/0221282 A1 Sep. 15, 2011

(30) Foreign Application Priority Data
Sep. 30, 2008 (JP) .................................. 2008-253407

(51) Int. Cl.
*H02K 41/03* (2006.01)
(52) U.S. Cl.
USPC .................. 310/12.15; 310/12.01; 310/12.05
(58) Field of Classification Search
USPC ............... 310/12.15, 12.31, 12.32, 13, 12.01, 310/12.05, 12.21
See application file for complete search history.

(56) References Cited

U.S. PATENT DOCUMENTS

| | | | | |
|---|---|---|---|---|
| 5,684,628 A | * | 11/1997 | Gerhard | 359/391 |
| 5,703,420 A | * | 12/1997 | Kamata et al. | 310/54 |
| 6,107,703 A | * | 8/2000 | Korenaga | 310/12.06 |
| 6,972,499 B2 | * | 12/2005 | Emoto | 310/12.25 |
| 6,987,335 B2 | * | 1/2006 | Korenaga | 310/12.15 |
| 7,218,020 B2 | * | 5/2007 | Emoto | 310/12.04 |
| 7,378,764 B2 | * | 5/2008 | Tosiya | 310/12.06 |
| 2002/0113498 A1 | * | 8/2002 | Emoto | 310/12 |

FOREIGN PATENT DOCUMENTS

| | | |
|---|---|---|
| CN | 1819416 A | 8/2006 |
| EP | 1233501 A2 | 8/2002 |
| JP | 6-141526 A | 5/1994 |

(Continued)

OTHER PUBLICATIONS

Supplementary European Search Report dated Dec. 29, 2011, issued in corresponding European Patent Application No. 08877175.3.

(Continued)

*Primary Examiner* — Tran Nguyen
*Assistant Examiner* — Naishadh Desai
(74) *Attorney, Agent, or Firm* — Westerman, Hattori, Daniels & Adrian, LLP (57) ABSTRACT

The moving magnet type linear motor according to the present invention comprises a stator comprising a plurality of coils arranged in a single direction and having a both ends support structure supporting both ends of the stator in a direction perpendicular to said single direction, a pair of movers comprising a plurality of permanent magnets arranged opposing the sides of the stator respectively and capable of relative movement in said single direction with respect to each other, and guidance mechanisms guiding both the movers independently and movably in said single direction, and one of the movers is connected to a load.

4 Claims, 5 Drawing Sheets

(56) References Cited

FOREIGN PATENT DOCUMENTS

| | | |
|---|---|---|
| JP | 8-168233 A | 6/1996 |
| JP | 2000-116104 A | 4/2000 |
| JP | 3387324 B2 | 3/2003 |
| JP | 3478084 B2 | 12/2003 |
| JP | 2004-040939 A | 2/2004 |
| JP | 2004-312956 A | 11/2004 |
| JP | 2005-086858 A | 3/2005 |
| JP | 3698585 B2 | 9/2005 |
| JP | 2006-197770 A | 7/2006 |
| JP | 2006-230127 A | 8/2006 |

OTHER PUBLICATIONS

International Search Report of PCT/JP2008/073044, date of mailing Mar. 17, 2009.

Korean Office Action mailed Apr. 1, 2013, issued in corresponding Korean Patent Application No. 10-2011-7007208, with English Translation (7 pages).

* cited by examiner

MOVING MAGNET TYPE LINEAR MOTOR

FIELD OF THE INVENTION

The present invention relates to linear motors, and particularly to a moving magnet type linear motor driving a load along a rail track in a single direction.

BACKGROUND OF THE INVENTION

A moving magnet type linear motor provided with a coreless or cored coil arranged on the side of a stator as well as a permanent magnet arranged on the side of a mover is widely applied, particularly as a driving source of a transportation mechanism with a long rail track, because it does not require expensive magnets arranged on the long rail track, and it does not generate heat nor need electric power provided on the mover side.

There are two types of moving magnet type linear motor. One is a two sided type in which a permanent magnet is arranged on both sides of the stator, and the other is a single side type in which the magnet is arranged only on a single side of the stator. In the two sided type linear motor, a perpendicular force generated between the stator and mover can be balanced out.

Figure 5:
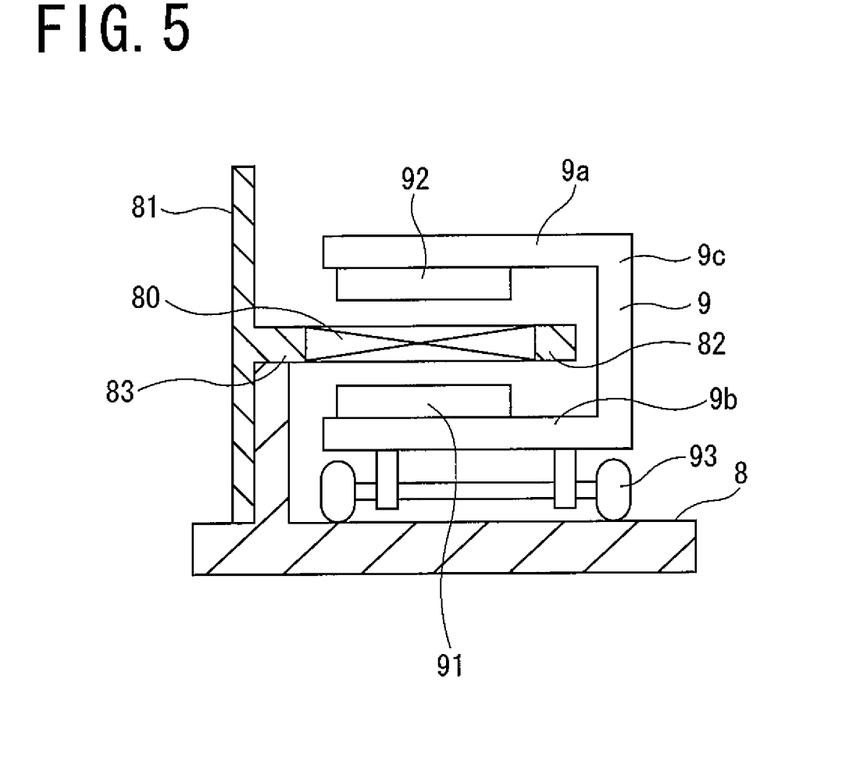
FIG. 5 is a cross sectional view of a conventional moving magnet type linear motor.

FIG. 5 shows a two sided type moving magnet type linear motor transporting goods/loads along a rail track on a base 8.

In this moving magnet type linear motor, a coiled body 80 comprising a plurality of coils arranged in a single direction is supported by a supporting member 81, and the coiled body 80 forms the stator. On the base 8, a yoke 9 with a U-shape cross section surrounding the coiled body 80 is movably supported by a wheel 93. Also, on the inner surface of the yoke 9, a plurality of permanent magnets 91, 92 are fixed opposing the sides of the coiled body 80 respectively. The yoke 9 and the plurality of permanent magnets 91, 92 form the mover (Japanese Patent Laid-Open No. 2005-86858, Japanese Patent Publication No. 3698585, Japanese Patent Publication No. 3478084, Japanese Patent Publication No. 3387324).

In the moving magnet type linear motor described above, a multiphase alternating current is applied to the coils forming the stator so that a shifting magnetic field is formed, thereby generating a thrust force on the mover in the same direction as the shifting magnetic field.

Therefore, in the moving magnet type linear motor shown in FIG. 5, a load is connected to the yoke 9 forming the mover so that the load can be transported in a single direction.

DISCLOSURE OF THE INVENTION

Problems to be Solved by the Invention

In a linear motor, the smaller the distance between the pair of permanent magnets (magnetic gap) is, the smaller magnetic resistance of the magnetic circuit for the magnetic flux between the magnets becomes. When the magnetic resistance is small, the density of the magnetic flux increases, and a large thrust force is obtained. In order to decrease the distance between the pair of permanent magnets, the thickness of the coiled body should be small.

However, in a conventional moving magnet type linear motor, as shown in FIG. 5, the yoke 9 comprises upper and lower horizontal walls 9a, 9b connected to each other via a vertical wall 9c, whereby the coiled body 80 is connected to the supporting member 81 at only a base end portion 83 of the coiled body 80, and a tip portion 82 of the coiled body 80 consequently becomes a free end. In such a one end support structure, the supporting strength of the coiled body 80 significantly reduces when the coiled body 80 becomes thin.

Therefore, it is possible that the stator comprising the coiled body 80 is deformed due to a temperature increase resulting from power supply or a reactive force against the thrust force. When the stator is deformed, the stator comes into contact with the mover while the mover moves, thereby causing damage or short circuit of the coil.

Therefore, there has conventionally been an attempt to increase the strength by molding the whole coil with resin or the like, however, as a result, the magnetic gap increases even more and the thrust force decreases.

An object of the present invention is to provide a moving magnet type linear motor capable of obtaining a greater thrust force than conventional linear motors.

Means for Solving the Problem

A moving magnet type linear motor according to the present invention comprises:

a stator 7 comprising a plurality of coils arranged in a single direction and having a both ends support structure supporting both ends of the stator 7 in a direction perpendicular to said single direction;

a pair of movers 5, 6 comprising a plurality of permanent magnets arranged opposing the sides of the stator 7 respectively and capable of relative movement in said single direction with respect to each other; and a guidance mechanism guiding both the movers 5, 6 independently and movably in said single direction, wherein one of the movers 6 is connected to a load.

In particular, the pair of movers 5, 6 comprises the plurality of permanent magnets jointed to a yoke respectively, or the plurality of permanent magnets arranged in a Halbach array or similar means of producing appropriate magnetic field.

In the moving magnet type linear motor according to the present invention described above, a divided structure is applied, in which the mover part to be arranged to sandwich the stator is divided into two parts and a pair of movers 5, 6 are arranged on both sides of the stator. The pair of movers 5, 6 are capable of relative movement with respect to each other.

Since the pair of movers 5, 6 have the divided structure, it is possible that the stator 7 has the both ends support structure in which both ends of the stator 7 are connected to a fixing member respectively.

Since the stator 7 thus has the both ends support structure, the strength of the stator increases compared to the conventional stator with the one end support structure.

Accordingly, even when the stator 7 is influenced by a temperature increase resulting from power supply or a reactive force against the thrust force or any other similar force perpendicular to the direction of motion, the amount of deflection of the stator 7 is small. Therefore, even when the distance between the movers 5 and 6 decreases to the extent of being greater than the maximum deflection of the stator 7, the movers 5, 6 and the stator 7 do not come into contact with each other while the movers 5, 6 move.

In the moving magnet type linear motor according to the present invention described above, a multiphase alternating current is applied to the coils forming the stator so that a shifting magnetic field is formed on both sides of the stator 7, thereby generating a thrust force on the pair of movers 5, 6 in the same direction as the shifting magnetic field.

Here, although the pair of movers 5, 6 are separated from each other, since they are subjected to the shifting magnetic field in the same direction at the same time, they move in the same direction being guided by the guidance mechanisms.

Thus, when a load is connected to one of the movers 6, the load can be moved by the driving of the movers 6. The other of the movers 5 is not connected to a load, and therefore, the movers 5 moves in accordance with the movement of said one of the movers 6.

In a particular configuration, both ends of the stator 7 are connected to a fixing member respectively, while the stator 7 is subjected to a tensional force in a direction perpendicular to said single direction.

According to this particular configuration, since the tensional force always acts on the stator 7, the deformation in the deflection direction due to the action of an external force is smaller than the deformation without the tensional force, and thereby further decreasing the distance between the movers 5 and 6.

Effect of the Invention

According to a moving magnet type linear motor of the present invention, since the stator 7 has the both ends support structure, the stator 7 can be thin, thereby decreasing the distance between the movers 5 and 6 to obtain a greater thrust force than in a conventional linear motor.

EXPLANATION OF LETTERS OR NUMERALS

1. Base
2. Carriage
3. First guidance mechanism
4. Second guidance mechanism
5. First mover
51. Permanent magnet
52. Yoke
6. Second mover
61. Permanent magnet
62. Yoke
7. Stator
71. Set of coils
72. Coiled body
73. Coiled body
74. Coiled body

BEST MODE FOR CARRYING OUT THE INVENTION

A preferred embodiment is specifically discussed below with reference to the drawings.

Figure 1:
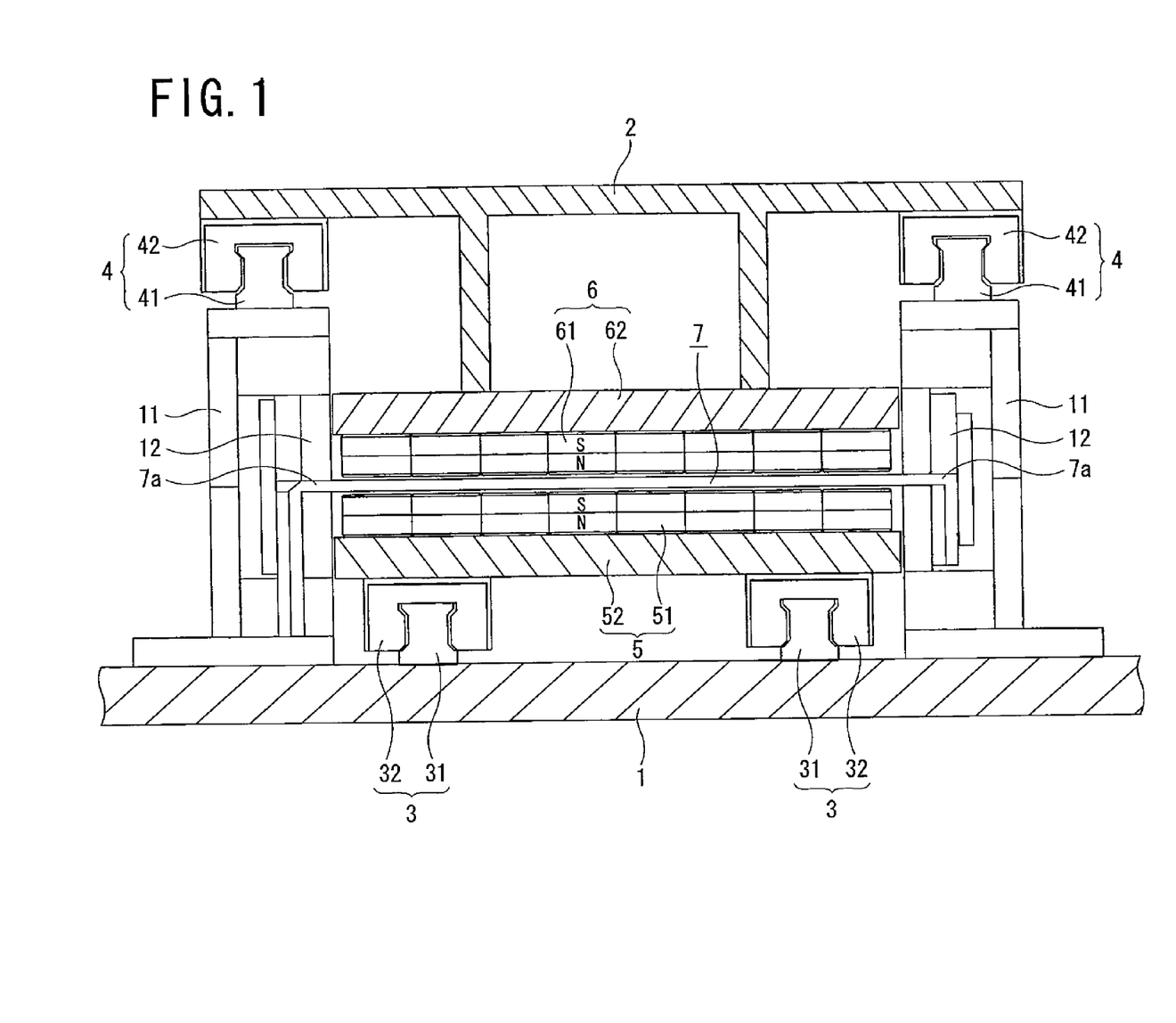
FIG. 1 is a cross sectional view of a moving magnet type linear motor according to the present invention.
Figure 2:
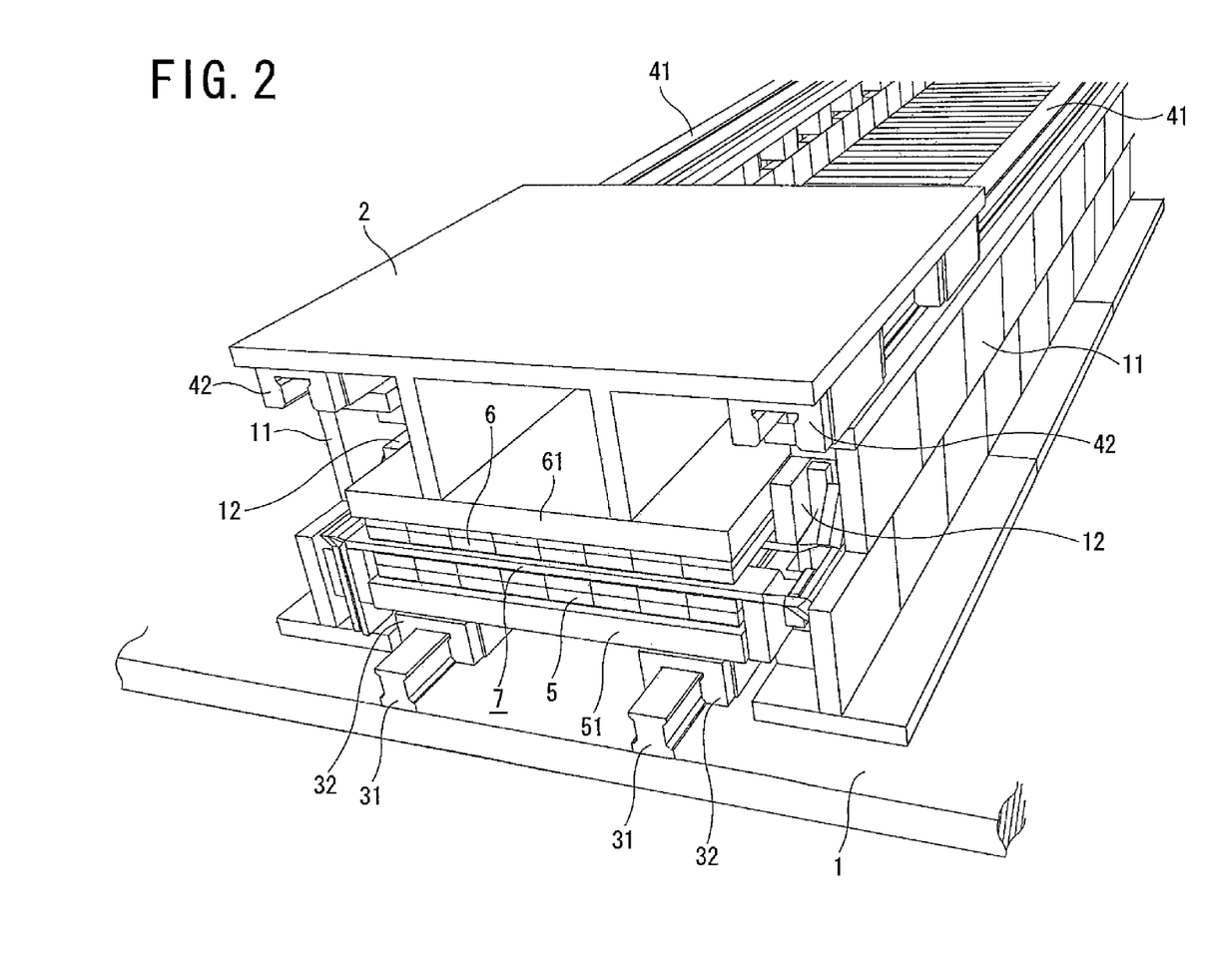
FIG. 2 is a perspective view of the moving magnet type linear motor according to the present invention.

A moving magnet type linear motor according to the present invention, as shown in FIGS. 1 and 2, includes a carriage 2 reciprocating along a given rail track on a base 1, and comprises a stator 7 comprising a plurality of coils arranged in a single direction as to be described later, and a first mover 5 and a second mover 6 arranged on lower and upper sides of the stator 7 respectively.

The carriage 2 is arranged on the second mover 6.

On the base 1, supporting members 11, 11 stand on both sides of the stator 7 and the movers 5, 6. A fixing member 12 is provided inside each supporting member 11, and both ends 7a, 7a of the stator 7 are supported by the fixing members 12, 12 on both sides throughout the rail track.

Figure 3:
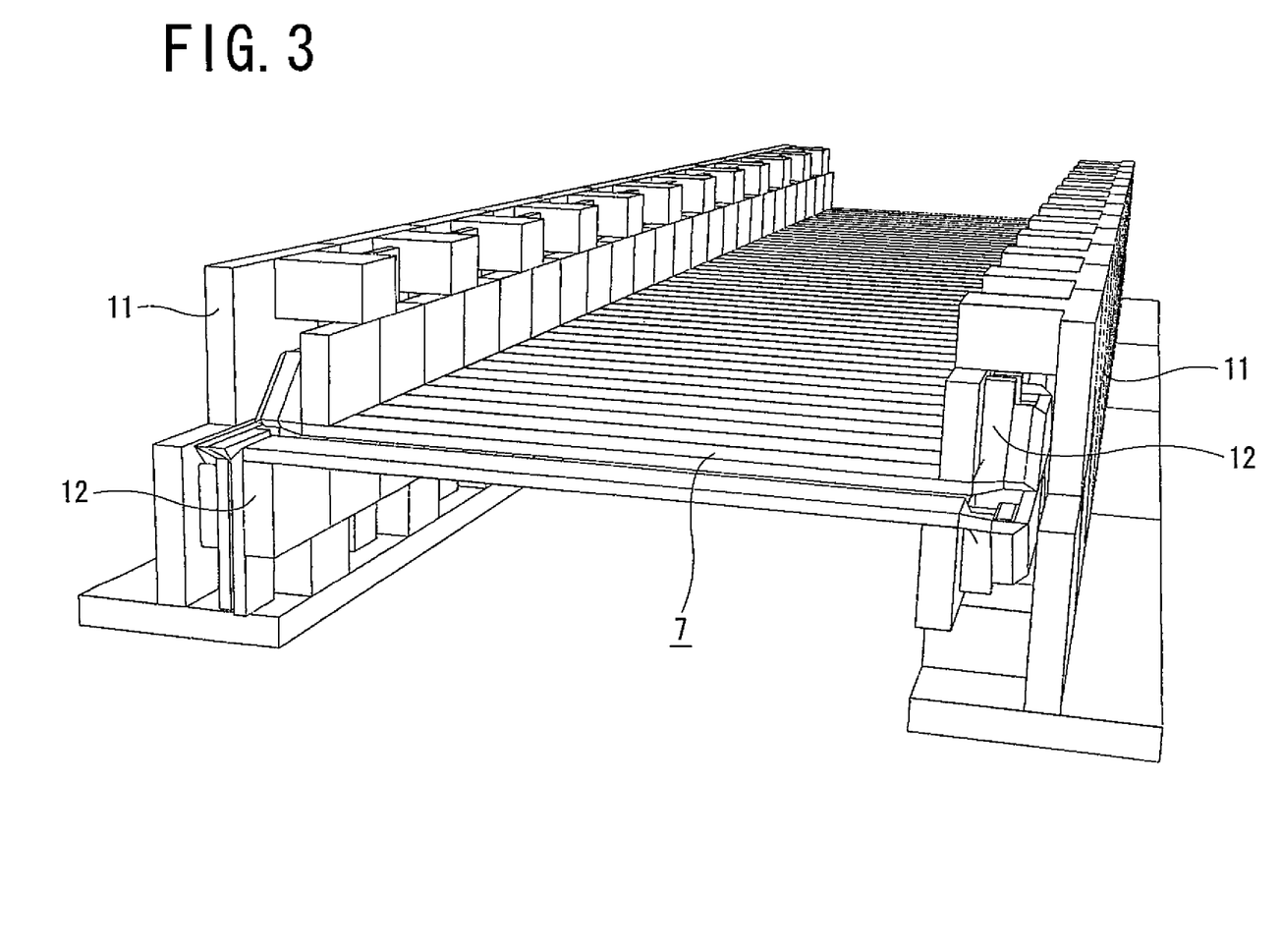
FIG. 3 is a perspective view of the moving magnet type linear motor in which a mover is omitted.

Here, as shown in FIG. 3, the stator 7 is connected to the fixing members 12, 12 on both sides, being subjected to a tensional force applied by the fixing members 12, 12.

As shown in FIGS. 1 and 2, a pair of rails 31, 31 extending along the given rail track are arranged on the base 1, and sliders 32, 32 are slidably engaged with the rails 31, 31 respectively and are connected to the first mover 5.

First guidance mechanisms 3, 3 guiding the reciprocation of the first mover 5 are thus configured.

Also, a pair of rails 41, 41 extending along the given rail track are arranged on the supporting members 11, 11, and sliders 42, 42 are slidably engaged with the rails 41, 41 respectively and are connected to the carriage 2.

Second guidance mechanisms 4, 4 guiding reciprocation of the carriage 2 and second mover 6 are thus configured.

Figure 4:
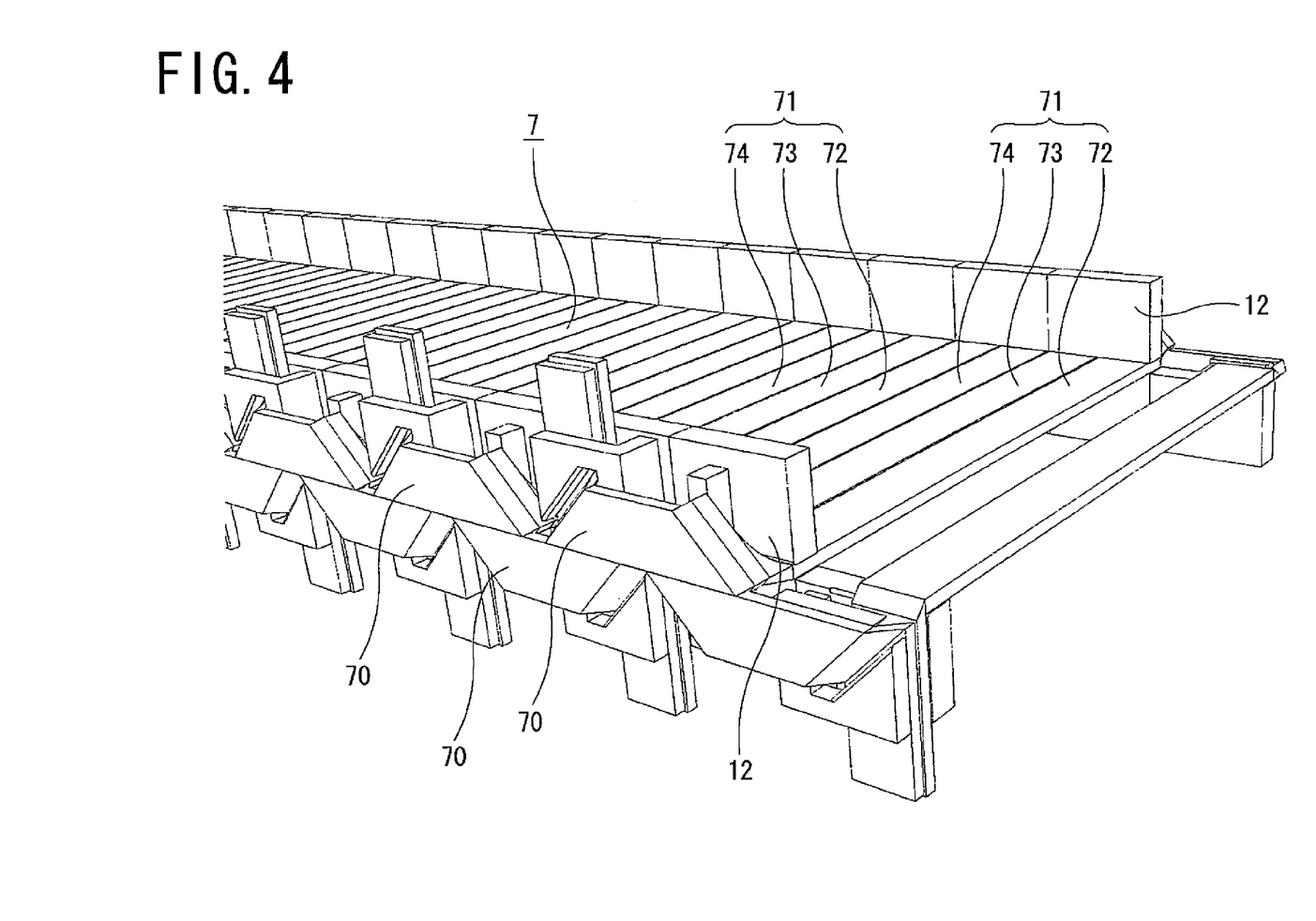
FIG. 4 is a perspective view of a stator showing the configuration thereof.

As shown in FIG. 4, a set of coil 71 comprises coiled bodies of U phase, V phase, and W phase 72, 73, 74 which are in the form of plates long in a widthwise direction, and the stator 7 comprises the plurality of sets of coils 71 articulated to each other in a direction of the rail track. Here, the coiled bodies of the same phase of the plurality of coiled bodies 72, 73, 74 are electrically connected to each other by a joint member 70.

For the plurality of coiled bodies 72, 73, 74, it is possible to adopt a structure in which the coiled body is formed by a band plate made of aluminum or copper, or a structure in which the coiled body is formed by molding a wound coil conducting wire with resin in the form of a plate.

According to the moving magnet type linear motor described above, as shown in FIGS. 1 and 2, since the first mover 5 and the second mover 6 are separated from each other, it is possible to connect both ends of the stator 7 to the fixing members 12, 12, thereby realizing a both ends support structure of the stator 7.

As a result, compared to a conventional stator with one end support structure, the supporting strength of the stator 7 is greater. In addition, since a tensional force is always acting on the stator 7, the amount of deflection of the stator 7 due to the action of an external force is smaller than the deformation without the tensional force.

Thus, even when the stator 7 is influenced by the temperature increase resulting from power supply or a reactive force against the thrust force, the deformation of the stator 7 in the deflection direction is small.

In addition, a both side type in which the first mover 5 and second mover 6 are arranged on both sides of the stator 7 is adopted, and therefore, a perpendicular force generated between the stator 7 and the first mover 5, and a perpendicular force generated between the stator 7 and the second mover 6 are balanced out. Therefore, it is not necessary for the stator 7 to have an excessive strength that can endure the perpendicular force.

There has been an attempt to thin the stator 7 and narrow the gap between the stator 7 and each of the movers 5, 6 within the limit where the stator and the movers 5, 6 do not come into contact with each other while the movers 5, 6 move.

In the moving magnet type linear motor according to the present invention described above, a multiphase alternating current is applied to the coils forming the stator 7 so that a shifting magnetic field is formed on both sides of the stator 7, thereby generating a thrust force on the first mover 5 and the second mover 6 in the same direction as the shifting magnetic field.

Here, although the first mover 5 and the second mover 6 are separated from each other, since they are subjected to the shifting magnetic field in the same direction at the same time, they move in the same direction being guided by the first guidance mechanism 3 and the second guidance mechanism 4 respectively.

The carriage 2 moves on the rail track in accordance with the movement of the second mover 6.

The first mover 5 moves in accordance with the movement of the second mover 6 since a load is not connected to the first mover 5.

As described above, according to the moving magnet type linear motor of the present invention, since the stator 7 has a both ends support structure to have high supporting strength, the stator 7 can be thinner, and therefore the gap between the first mover 5 and the second mover 6 can be narrower, thereby obtaining a greater thrust force than in a conventional moving magnet type linear motor.

Also, it is possible to increase the effective length (length of the widthwise direction that is perpendicular to a rail track direction) of the stator 7, thereby increasing the utilization efficiency of the coil forming the stator 7 and the transportation space.

Each element of the present invention is not limited to the foregoing embodiment in construction but can be modified variously within the technical scope of the invention as set forth in the appended claims. For example, the first mover 5 and the second mover 6 are not limited to the structures in which a plurality of permanent magnets 51, 52 are jointed to yokes 52, 62 respectively, but it is also possible to adopt a structure in which a plurality of permanent magnets are arranged in a Halbach array, thereby omitting the yoke or replacing the yoke with a nonmagnetic material.

Also, the moving magnet type linear motor according to the present invention is not limited to the transportation mechanism which makes a load reciprocate along a rail track in a horizontal direction such as a vehicle or a cart, but it is possible to apply the moving magnet type linear motor to a transportation mechanism which makes a load reciprocate in a vertical direction such as an elevator.

In addition, it is possible to implement the present invention not only in a linear synchronous type motor, but also in a linear DC motor.

What is claimed is:

1. A moving magnet type linear motor comprising:
    a stator comprising a plurality of coils in the form of plates, the coils being arranged in a single direction so as to form a plate-like arrangement and supported at its opposed ends in a direction perpendicular to said single direction;
    a pair of movers arranged facing on opposite sides of the stator respectively and capable of relative movement in said single direction with respect to each other, wherein at least one of the movers comprises a plurality of permanent magnets; and
    a guidance mechanism configured to guide both the movers independently and movably in said single direction,
    wherein one of the movers is connected to a load.

2. The moving magnet type linear motor according to claim 1, wherein the stator is connected at each of the opposed ends to a fixing member, while the stator is subjected to a tensional force in a direction perpendicular to said single direction.

3. The moving magnet type linear motor according to claim 1, wherein the pair of movers each comprises a yoke jointed to the plurality of permanent magnets.

4. The moving magnet type linear motor according to claim 1, wherein the pair of movers each comprises the plurality of permanent magnets arranged in a Halbach array.

* * * * *

UNITED STATES PATENT AND TRADEMARK OFFICE
CERTIFICATE OF CORRECTION

PATENT NO.       : 8,502,421 B2
APPLICATION NO. : 13/120253
DATED            : August 6, 2013
INVENTOR(S)      : Markon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this

Fifteenth Day of September, 2015

Michelle K. Lee
*Director of the United States Patent and Trademark Office*